United States Patent [19]

Ohsaki et al.

[11] 4,445,818
[45] May 1, 1984

[54] APPARATUS FOR SUPPLYING HYDRAULIC FLUID

[75] Inventors: Hiroshi Ohsaki; Takeshi Ohe, both of Higashimatsuyama, Japan

[73] Assignee: Jidosha Kiki Co., Ltd., Tokyo, Japan

[21] Appl. No.: 349,412

[22] Filed: Feb. 16, 1982

[30] Foreign Application Priority Data

Mar. 13, 1981 [JP] Japan ................... 56-36031

[51] Int. Cl.³ .............................................. F04B 49/08
[52] U.S. Cl. ..................................... 417/288; 417/299
[58] Field of Search ............... 417/286, 287, 288, 299, 417/302, 303, 304, 308

[56] References Cited

U.S. PATENT DOCUMENTS 3,314,495  7/1967  Clark et al. ..................... 180/79.2
3,985,472 10/1976  Virtue et al. ..................... 417/287
4,412,789 11/1983  Ohe et al. ........................ 417/288

FOREIGN PATENT DOCUMENTS 1040904 10/1958  Fed. Rep. of Germany ...... 417/287
2038933  4/1980  United Kingdom .

Primary Examiner—Richard E. Gluck
Attorney, Agent, or Firm—Flynn, Thiel, Boutell & Tanis

[57] ABSTRACT

A flow path switching valve is provided, operating to merge hydraulic fluid from a plurality of pumps in accordance with a magnitude of a loading applied to a hydraulic unit, and a variable orifice is defined adjacent to the valve. A flow control valve is also provided for returning part of the hydraulic fluid to a tank, and operates in accordance with the throttle opening of the variable orifice which changes in accordance with the operation of the flow path switching valve.

9 Claims, 9 Drawing Figures

APPARATUS FOR SUPPLYING HYDRAULIC FLUID

BACKGROUND OF THE INVENTION

The invention relates to an apparatus for selectively supplying hydraulic fluid discharged from a plurality of pumps to a hydraulic unit.

Considering a power steering system, for example, which is mounted on an automobile to alleviate the magnitude of a force which is required for a driver to operate a steering wheel, a pump may be used as a source of oil pressure. Such pump is driven for rotation by an engine of the automobile, and has a discharge rate which increases or decreases in proportion to the number of revolutions of the engine. Accordingly, it is necessary that such pump has a sufficient capacity to supply enough fluid to operate the hydraulic unit such as a power steering device properly even if the engine operates at a low number of revolutions or with a reduced discharge from the pump.

However, it will be seen that if the pump is provided with such capacity, it follows that an unnecessarily large amount of fluid is supplied when the engine operates at a higher number of revolutions. This not only results in a waste in itself, but also increases the dissipation of the horsepower of the engine which is used to drive the pump, which is undesirable from the viewpoint of power saving. In addition, a recent trend is directed to improving the fuel cost of the engines mounted on automobiles, and hence it is desired that the dissipation of the horsepower which is utilized to drive the pump associated with the power steering device be minimized.

To cope with this problem, a variety of apparatuses for supplying hydraulic fluid have been proposed in the prior art, including a single pump cartridge having a pair of pressure chambers which are disposed in symmetrical relationship with each other and which are separated from each other to provide a pair of pumps, and the use of a pair of pumps, each of a reduced capacity, and which are connected to a flow path switching mechanism so that hydaulic oil therefrom can be selectively supplied. Specifically, the switching mechanism is operated in a manner such that normally only one of the pumps is utilized to supply the hydraulic oil while the other is connected to an associated tank to present no load, thus attempting to achieve a reduction in the dissipation of the horsepower. However, when necessary, the hydraulic oil from the both pumps is combined for supply to a hydraulic unit. Also, several different techniques are employed to control the supply of such hydraulic oil. By way of example, in an arrangement which senses the number of revolutions, the hydraulic oil from the both pumps is combined when the number of revolutions of the engine is in its low range or in response to the flow whenever the discharge from the respective pumps is low. In another arrangement of the pressure sensing type, the hydraulic oil from both pumps is combined in response to the detection of a hydraulic pressure which is produced whenever a hydraulic unit is loaded to actuate a power steering device and irrespective of the magnitude of the number of revolutions of the engine.

In the former arrangement, when the automobile is running at a high speed, or in a high range of the number of revolutions of the engine, only one of the pumps is driven, thus permitting a reduction in the dissipated horsepower to be achieved. However, in a low range of the number of revolutions of the engine, a power loss is unavoidable, leaving much to be improved. This is attributable to the fact that an increased quantity of hydraulic oil is necessary only during a steering operation when it is loaded, and the supply of the hydraulic oil may be at a lower level when the automobile is at rest or running straightforward even though the engine is rotating in its low range. In particular, 10 mode running patterns, for example, which represent a running through city areas, are most frequently utilized with automobiles, and hence it is desirable that the dissipation of the horsepower be reduced when the automobile is running at such low speeds.

In the latter arrangement, the problem associated with a low range of the number of revolutions of the engine can be eliminated to achieve a power saving, while a power loss in the high range is unavoidable. Specifically, in the low range of the number of revolutions of the engine and when the power steering device is not actuated, the other pump can be connected to the tank to present no load, thus allowing a reduction in the dissipated horsepower. However, in the high range of the number of revolutions of the engine where the single pump is able to supply sufficient hydraulic oil, the actuation of the power steering device causes the flow path to be switched in a manner to permit the hydraulic oil from the both pumps to be combined or merged. However, this results in supplying more than necessary hydraulic oil to the power steering device, resulting in a waste and causing a malfunctioning due to an excessive flow rate. To avoid this difficulty, a flow control valve is associated with the arrangement so that a constant supply can be maintained in the high range of the number of revolutions of the engine while returning an excessive amount of the hydraulic oil to the tank otherwise. However, there arises a problem of running stability.

Specifically, an increased supply of hydraulic oil when the automobile is running at a high speed, results in a reduced reaction of the steering wheel as sensed by the driver, which produces an uneasiness in the mind of the driver and thus is undesirable in providing a good steerability. In addition, it is to be noted that the steering wheel need be seldom operated through an increased stroke when running at such high speed.

It will be appreciated that an operation of the steering wheel is required when the automobile is running at low speeds. For this reason, an arrangement of the kind described is usually provided with a drooping mechanism which is associated with the flow control valve so that the supply of the hydraulic oil can be reduced to a degree in a high range of the number of revolutions of the engine. Such a drooping mechanism is often employed on passenger automobiles with a great advantage.

The use of the drooping mechanism provides a suitable reaction to the driver when maneuvering the steering wheel, since it reduces the supply below a given value in the high range of the number of revolutions of the engine, and thus improves the steerability and is most effective when the automobile is running at high speeds. Reaction sensed by the driver when operating the steering wheel is further improved by the use of the drooping mechanism since it allows a sequential increase in the supply which is necessary to compensate for an increasing load in the hydraulic pressure circuit during an operation of the steering wheel. Additionally, the drooping mechanism is effective and useful in minimizing a power loss by reducing a pressure loss which occurs across pipings and within the power steering device, through a reduction in the supply of the hydraulic oil to the power steering device when the automobile is running at high speeds.

Therefore, it has been attempted in the prior art to provide a combination of the drooping mechanism which brings forth these advantages with the hydraulic fluid supplying apparatus mentioned above which achieves a power saving. However, a problem is presented in that the described desirable drooping effects are not available when the drooping mechanism is simply added to the arrangement of pressure sensing type mentioned above unless the number of revolutions of the engine reaches a value higher than the number of revolutions at which it will be effective when the mechanism is associated with a usual pump. Thus, a problem occurs in respect of the dynamic response. This results from the fact that a conventional drooping mechanism utilizes a flow control valve which is disposed in the hydraulic pressure supply path, which valve can be operated with a supply of hydraulic oil which can be obtained only when the number of revolutions reaches a higher value than in the usual arrangement.

SUMMARY OF THE INVENTION

Therefore, it is an object of the invention to provide an apparatus for supplying hydraulic fluid capable of reducing the horsepower dissipated to drive the pump to a required minimum to thereby further improve a power saving effect and also capable of exercising a satisfactory operation in accordance with operating demands without causing any adverse influence upon the hydraulic unit.

This object is achieved by a combination of a flow path switching valve responsive to a sensed application of a load on the hydraulic fluid for combining hydraulic fluid from a plurality of pumps, and a flow control valve responsive to a sensed change in the load applied to the hydraulic unit for returning part of the hydraulic fluid flowing passing through the supply path to the tank, thus providing a variable flow rate. Under no load condition, the supply of the hydraulic fluid is minimized, and as the load increases, the flow rate is sequentially increased to assure that a sufficient flow rate to operate the hydraulic unit can be supplied.

It is another object of the invention to provide an apparatus for supplying hydraulic fluid which is simple in construction while assuring a flow rate control of a high reliability. This object is achieved by controlling the flow rate through the use of a variable orifice which changes its throttle opening in response to an operation of the flow path switching valve.

It is a further object of the invention to provide an apparatus for supplying hydraulic fluid which reduces the supply under no load condition to a required minimum, and reduces, when applied to a power steering device, the dissipated power whenever a steering wheel is not operated under all the running conditions of an automobile, and improves the rigidity of the steering wheel in the region of its neutral position, thus achieving a power saving while assuring a comfortable and safe steering operation.

Other objects and advantages of the invention will become apparent from the following description with reference to the drawings.

DESCRIPTION OF EMBODIMENTS

Figure 1:
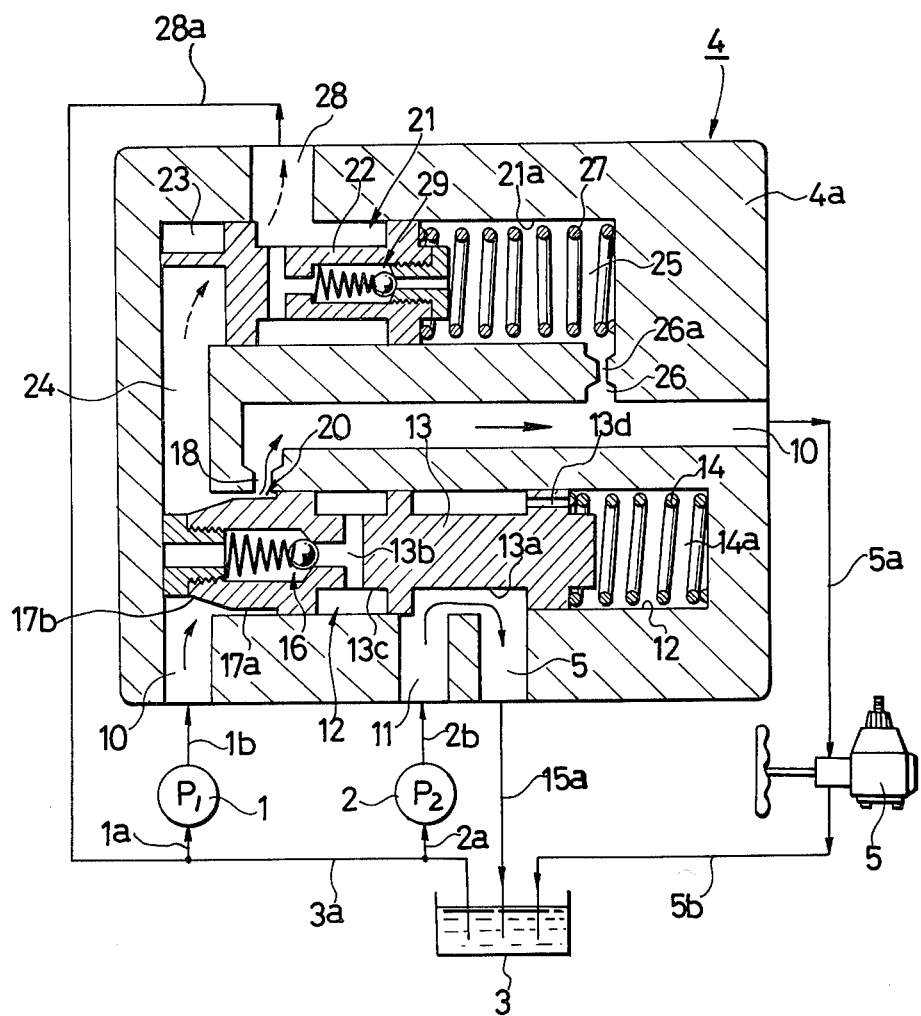
FIG. 1 is a schematic diagram of an apparatus for supplying hydraulic fluid according to one embodiment of the invention as applied to a power steering device.

Referring to FIG. 1, there is shown an apparatus for supplying hydraulic fluid according to one embodiment of the invention as applied to a power steering device of an automobile. As shown, there are provided a first and a second pump 1, 2 which separately discharge hydraulic oil. It is to be noted that the both pumps are driven for rotation by an engine, not shown. Each of the pumps 1, 2 serves to circulate a working oil contained in a tank 3 to a power steering device 5 through a control 4.

It is to be noted that the pumps 1, 2 need not be separate from each other, but may be integrally constructed so that they share a common casing and drive shaft. Alternatively, a pair of pressure chambers which are symmetrically disposed in a single pump cartridge may be utilized as separate pumps. In this instance, the first pump 1 may have a capacity which is less than the capacity of the second pump 2 in order to improve a power saving effect. The pumps 1, 2 include suction lines 1a, 2a and discharge lines 1b, 2b. A line 3a connects the tank with the lines 1a, 2a. A hydraulic oil is supplied to the device 5 through a line 5a connected between the control 4 and the device 5 while the oil from the device 5 is returned to the tank 3 through another line 5b.

The construction of the control 4 which selectively supplies the hydraulic oil discharged from the first and the second pump 1, 2 to the power steering device 5 in accordance with the invention will now be described. A main passage 10 is connected to supply the hydraulic oil from the first pump 1 to the power steering device 5 while an auxiliary passage 11 is connected to receive the hydraulic oil from the second pump 2. A flow path switching valve 12 is disposed between the passages 10, 11, and senses and responds to a change in the pressure of hydraulic oil flowing through the main passage 10 which in turn depends on the magnitude of a loading on the power steering device 5.

Specifically, the switching valve 12 comprises a valve opening 12a formed in a casing 4a so as to extends transverse to the main passage 10, and a spool 13 which is slidably received within the valve opening 12a. The spool 13 is normally urged by a spring 14 to be displaced toward an end of the valve opening 12a which is located nearer the main passage 10. Under this condition, the auxiliary passage 11 which opens into an axially central region of the valve opening 12a is disconnected from the main passage 10 and communicates with a drain passage 15, extending in parallel relationship with the passage 11, through an annular groove 13a formed in the outer periphery of the spool 13. The drain passage 15 then communicates with the tank 3 through a drain line 15a.

Accordingly, when the flow path switching valve 12 is not operated, only the discharge from the first pump 1 is supplied to the power steering device 5 through the main passage 10 while the hydraulic oil from the second pump 2 merely circulates through the tank 3, with consequence that the second pump 2 is maintained under no load condition. Accordingly, the dissipation of the horsepower which is utilized to drive this pump is substantially reduced, achieving a power saving effect. Such advantage is notable particularly under low speed and low pressure condition when the pump discharge is low and the power steering device 5 is not loaded.

Figure 2:
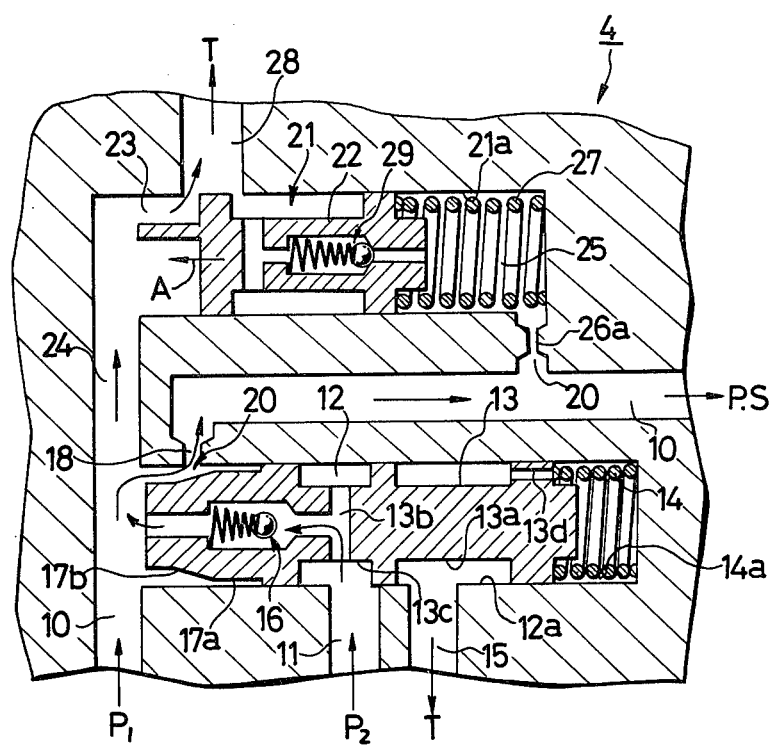
FIG. 2 is a similar view illustrating an operative condition of the apparatus.

The flow path switching valve 12 is provided with a check valve 16 which is formed in the end of the spool 13 which is located nearer the main passage 10. The spool 13 is formed with a bore 13b which diametrically extends therethrough and which communicates with an annular groove 13c formed in the outer periphery thereof, and the check valve 16 communicates with the auxiliary passage 11 when the spool 13 has moved to the right. Obviously, in this operative position, the spool 13 interrupts a communication between the auxiliary passage 11 and the drain passage 15. The check valve 16 is adapted to be opened by the hydraulic oil supplied from the second pump 2 to introduce it into the main passage 10 so as to be merged with the hydraulic oil from the first pump 1, as indicated in FIG. 2.

A low pressure chamber 14a is defined in the right-hand end of the valve opening 12a, and the hydraulic pressure of the tank 3 is introduced into the low pressure chamber through a small opening 13d. At this time, the left-hand end of the spool 13 projects through the end of the valve opening facing the main passage 10. Hence the spool 13 senses and responds to an increased pressure within the main passage 10 which occurs in response to an increased loading on the power steering device 5, by moving to the right, as viewed in the drawings, thus switching the flow paths.

It is important to note in the arrangement of the flow path switching valve 12 that adjacent to its left-hand end facing the main passage 10, the spool 13 is formed with a region 17a of a reduced diameter and a tapered region 17b which is contiguous thereto, thereby defining an orifice 20 between it and a downstream opening 18 of the main passage 10 which opens into the valve opening 12a, and which is variable as the spool 13 moves. The variable orifice 20 is constructed in a manner such that it detects the flow rate of the hydraulic oil from the first pump 1 which flows through the main passage 10 or of the combined hydraulic oil from the first and the second pump 1, 2, as a pressure differential thereacross, which is utilized to control a flow control valve 21 disposed in the main passage 10.

Briefly considering the flow control valve 21 which is controlled by the variable orifice 20, the purpose of the flow control valve 21 is to control the flow rate of the hydraulic oil passing through the main passage 10 by returning an excessive amount of hydraulic oil to the tank 3. It includes a valve opening 21a extending parallel to the main passage 10 and in which a spool 22 is slidably received. A high pressure chamber 23 is defined adjacent to the left-hand end of the spool 22 while a low pressure chamber 25 is defined adjacent to the right-hand end of the spool 22. The hydraulic oil upstream of the variable orifice 20 is introduced into the high pressure chamber 23 through a passage 24 while the hydraulic oil downstream of the variable orifice 20 is introduced into the low pressure chamber 25 through a passage 26 including an orifice 26a which serves to prevent an oscillation of the valve. The spool 22 is normally urged by a spring 27, disposed within the low pressure chamber 25, to be displaced toward the high pressure chamber 23. In this position of the spool, a drain passage 28 which opens into a lateral side of the valve opening 21a is disconnected from the high pressure chamber 23. A drain line 28a connects the drain passage 28 with the tank 3, and a relief valve 29 is disposed within the spool 22.

In operation, the flow control valve 21 sequentially moves toward the low pressure chamber 25 in accordance with a pressure differential across the variable orifice 20, with consequence that a communication is established between the high pressure chamber 23 and the drain passage 28 to return part of the hydraulic oil from the main passage 10 to the tank 3 through the passage 24. It is to be noted that the degree of the throttling action by the variable orifice 20 is changed by the flow path switching valve 12 which responds to an increase in the loading on the power steering device 5.

Considering this in more detail, in a conventional arrangement of this type, a fixed orifice having a given throttling opening is employed in order to detect the flow rate of the hydraulic oil passing through the main passage 10, whereby the flow control valve operates to maintain a constant supply of hydraulic oil. By contrast, in accordance with the invention, the flow control valve 21 is controlled in accordance with the throttle opening of the variable orifice 20 or a movement of the flow path switching valve 12, thereby varying the flow rate which is returned to the tank 3. In this manner, the flow rate of the hydraulic oil which is supplied from the main passage 10 to the power steering device 5 is adjusted in a controllable manner.

More specifically, when the power steering device 5 is under no load, namely, when no steering operation is performed, the flow path switching valve 12 remains inoperative as shown in FIG. 1, and hence the throttle opening of the variable orifice 20 is maintained at its minimum value within its variable range. Accordingly, only the hydraulic oil supplied from the first pump 1 is fed through the main passage 10, and when the flow rate thereof exceeds a given value, the flow control valve 21 is operated in accordance with the pressure differential across the variable orifice 20 to maintain a constant supply of the hydraulic oil. Such condition is illustrated by a phantom line $P_0$ in FIG. 3, corresponding to the flow rate of $Q_1$.

It is important to note here that the flow rate of the hydraulic oil thus supplied under no load condition is reduced to its required minimum, which is nearly one-half the flow rate used in the prior art and which is substantially equal to the flow rate of the conventional arrangement when the drooping action is utilized.

Accordingly, in accordance with the invention, when the automobile is running at a high speed, the rigidity of the steering wheel is increased to a degree, in a similar manner as achieved by the drooping effect in the conventional arrangement, thus assuring a running stability while affording an improved steerability. By establishing a low flow rate for the hydraulic oil which is used under no load condition, the back pressure applied to the pump is reduced, and a pressure loss across lines or pipings is decreased, thus enabling a further power saving effect. It should also be noted that under no load condition, the flow path switching valve 12 disconnects the second pump from the main passage 10, and hence the second pump is under no load condition, thus reducing the dissipated power which is used to drive the pump, further contributing to the achievement of a power saving effect.

When a load is applied by the actuation of the power steering device 5, the flow path switching valve 12 is effective to merge the hydraulic oil from the second pump 2 with the hydraulic oil from the first pump 1 so as to be fed through the main passage 10 even though the number of revolutions of the pumps is low to result in a reduced discharge. At this time, the throttling opening of the variable orifice 20 also changes, urging the flow control valve 21 in a direction indicated by an arrow A in FIG. 2, with result that the flow rate of the hydraulic oil which is returned to the tank 3 is limited, thereby increasing the supply to the power steering device 5 in order to provide a reaction to the steering operation which depends on the magnitude of the load.

Figure 3:
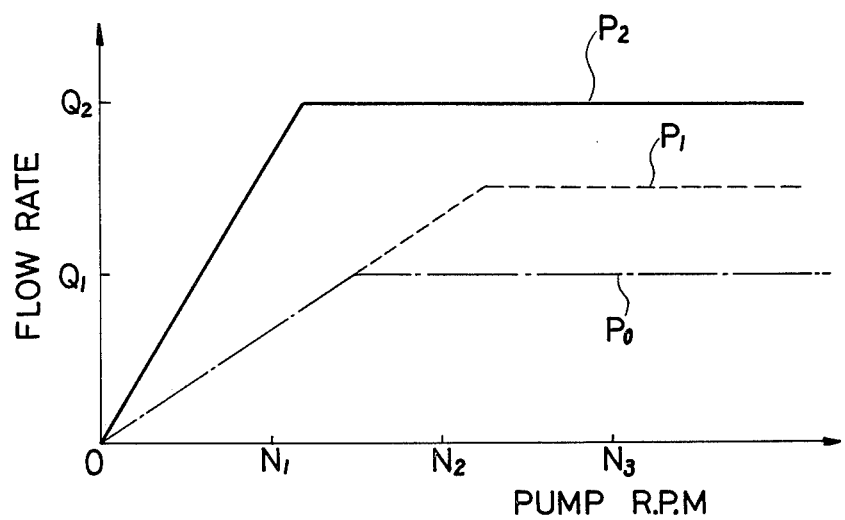
FIGS. 3 and 4 graphically illustrate the flow rate characteristic of the apparatus.

Such effect is achieved by increasing the throttling opening of the variable orifice 20 in response to the operation of the flow path switching valve 12, with consequent reduction in the pressure differential thereacross to cause the spool 22 of the valve 21 to move in a direction to close the passage 28 leading to the tank 3. In FIG. 3, a broken line curve $P_1$ represents the flow rate response under a small load while a solid line curve $P_2$ represents the flow rate response under a high load condition.

Figure 4:
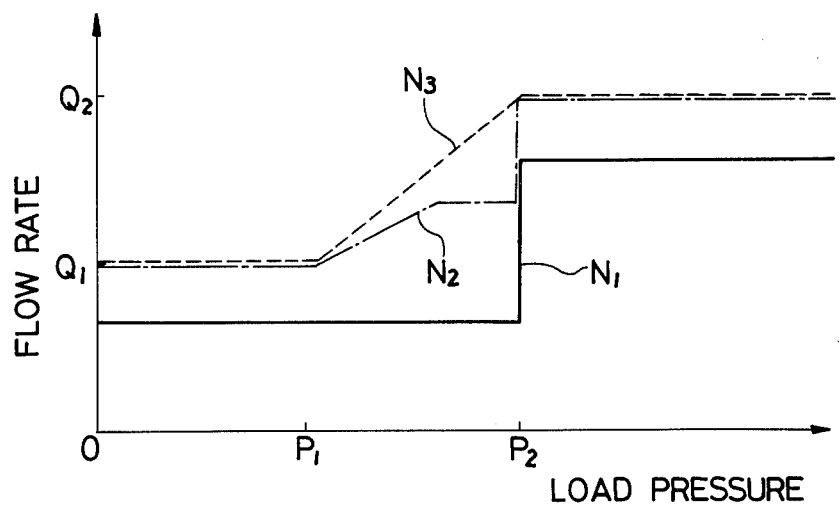

FIG. 4 graphically illustrates typical changes in the flow rate controlled as a function of a varying load pressure, in a manner corresponding to the numbers of revolutions of the pumps $N_1$, $N_2$ and $N_3$ shown in FIG. 3. It is assumed that the resilience of the spring 14 is chosen so that the flow path switching valve 12 of pressure sensing type is operated when the hydraulic pressure within the passage reaches $P_1$ in response to the actuation of the power steering device 5. By allowing the flow path switching valve 12 to operate in accordance with the magnitude of the load, the throttling opening of the variable orifice 22 varies, thereby controlling the flow control valve 21 in a manner such that a desired flow rate is supplied to the power steering device 5.

Importantly, it is to be noted that controlling the flow control valve 21 in accordance with a change in the variable orifice 20 as the flow path switching valve 12 operates in the apparatus of the invention permits the response of the controlled flow rate to be freely changed, by a suitable choice of the resilience of the spring 14, a switching point of the spool or the configuration of the variable orifice 20 in the flow path switching valve 12. By way of example, by changing the configuration of the spool 13 of the switching valve 12 in accordance with an increase or decrease in the load, the throttling opening of the variable orifice 20 may be varied to allow the flow rate which is controlled by the flow control valve 21 to be established in a desired manner.

As discussed, with the apparatus of the invention, a magnitude of flow rate which is required to operate the power steering device 5 can be supplied in accordance with a loading applied thereto, thus assuring a comfortable steering operation without any adverse influence upon the operation of the power steering device 5 and while achieving a power saving effect.

It is to be noted that in FIG. 2, $P_1$ represents the first pump 1, $P_2$ the second pump 2, T the tank 3, P.S. the power steering device 5, respectively.

In the operation described above, it is assumed that the flow control valve 21 is controlled by the operation of the flow path switching valve 12 when the flow control valve 21 is operative or when an overflow occurs and part of the hydraulic oil is returned to the tank 3. However, it should be noted that with the apparatus of the invention, when the flow control valve 21 is inoperative, a change of the variable orifice 20 as a result of the operation of the flow path switching valve 12 displaces the operating point of the flow control valve 21, thus varying the maximum flow which can be supplied.

FIGS. 5 to 9 show other embodiments of the invention and in these Figures, parts identical with or corresponding to those shown in FIG. 1 are designated by like reference numerals and characters without repeating their description.

Figure 5:
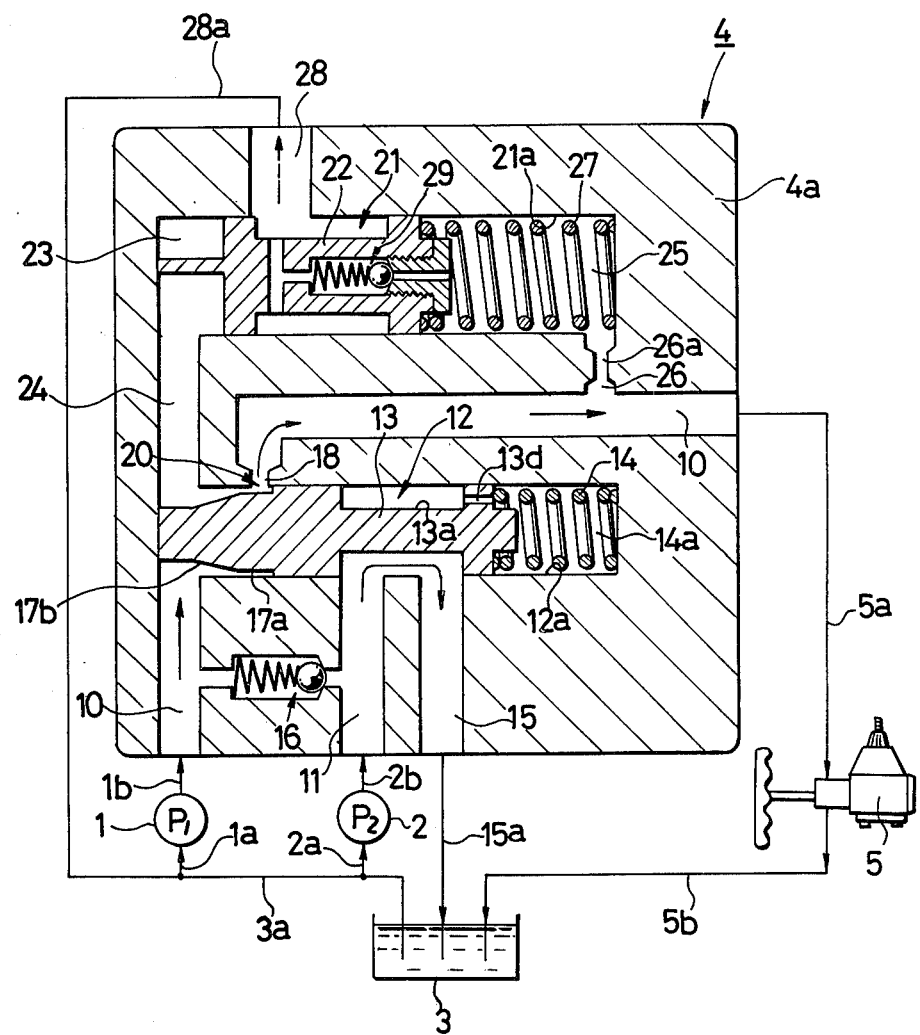
FIGS. 5 to 9 are schematic diagrams of other embodiments of the invention.

In a second embodiment shown in FIG. 5, the check valve 16, which has been internally housed within the spool 13 of the flow path switching valve 12 in the first embodiment shown in FIG. 1 to allow the hydraulic oil from the second pump 2 to be merged with that from the first pump 1, is transposed, and is separately disposed at a location intermediate the main and the auxiliary passage 10, 11. This embodiment operates in the similar manner and achieves the similar effect as the first embodiment.

Figure 6:
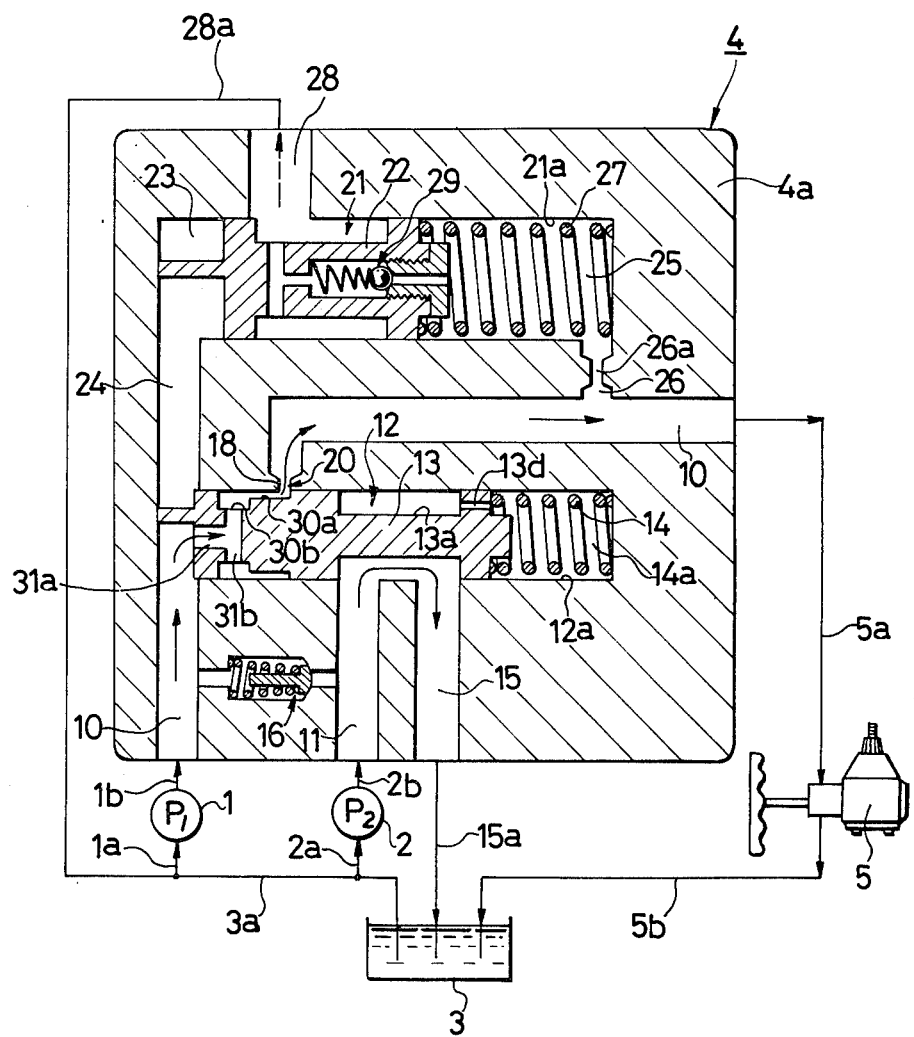

FIG. 6 shows a third embodiment in which the spool 13 forming the flow path switching valve 12 is provided in its left-hand end with a pair of annular grooves 30a, 30b of different diameters, which cooperate with the opening 18 of the main passage 10 to define the variable orifice 20. The hydraulic oil from the pumps 1, 2 is introduced into the variable orifice 20 through a longitudinal passage 31a formed in the left-hand end of the spool 13 and another passage 31b which diametrically extends through the spool. Again, this embodiment operates in the similar manner and achieves the similar effect as the first embodiment.

Figure 7:
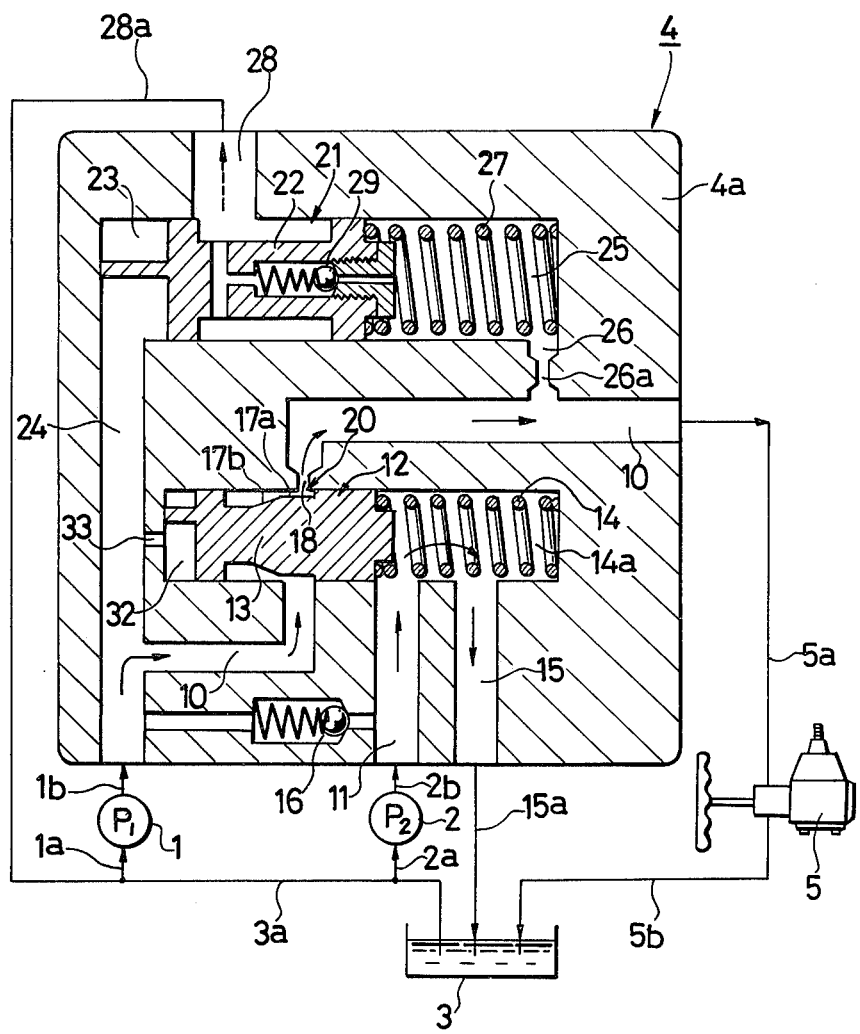

FIG. 7 shows a fourth embodiment in which the main passage 10 is defined to extend in a direction perpendicular to the direction of movement of the spool 13 which forms the flow path switching valve 12. Except for the fact that the hydraulic oil flows in a direction perpendicular to the axial direction of the spool 13, this embodiment operates in the similar manner and achieves the similar effect as the first embodiment. It is to be noted that in this Figure, numeral 32 represents a high pressure chamber into which the hydraulic pressure from the main passage 10 is introduced through an inlet 33.

Figure 8:
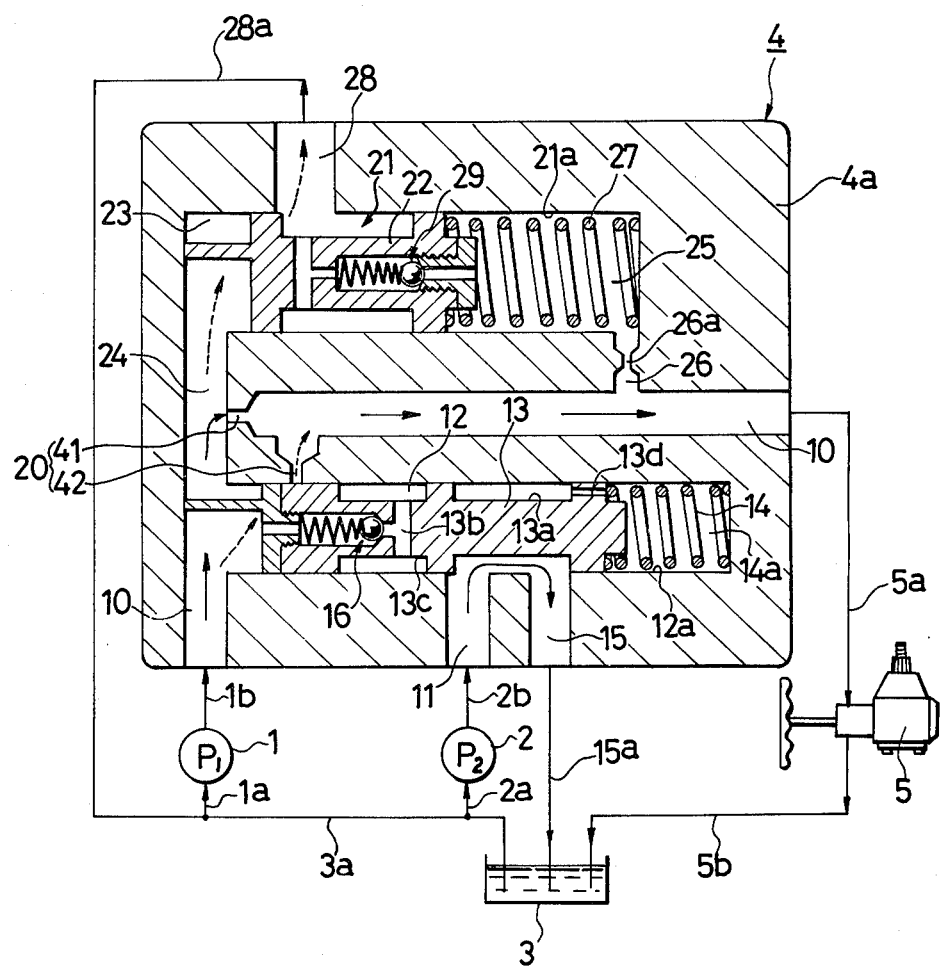

FIG. 8 shows a fifth embodiment, which represents a large modification from the previous embodiments in that the variable orifice 20 is defined by a pair of fixed throttle 41 and variable throttle 42. Specifically, the fixed throttle 41 is disposed intermediate the main passage 10 for operating the flow control valve 21. As a result of such arrangement, unless the flow path switching valve 12 operates, the flow rate of the hydraulic oil from the first pump 1 is maintained below a given value. On the other hand, part of the main passage 10 opens into the valve opening 12a which defines the flow path switching valve 12, and the variable throttle 42 is formed so as to be normally blocked by the outer periphery of the spool 13. The variable throttle 42 is opened whenever the flow path switching valve 12 operates, with consequent change in the throttle opening of the variable orifice 20. Accordingly, the flow control valve 21 controls the supply of the hydraulic oil in accordance with a pressure differential which is determined by the throttle opening, thus performing the similar operation and achieving the similar effect as the first embodiment described above.

It is to be noted that in this embodiment, the variable throttle 42 is opened or closed by the outer periphery of the spool 13, so that the flow rate controlled by the flow control valve 21 may be varied in an on-and-off manner in accordance with the magnitude of a loading, even though this is not essential. Alternatively, it is also possible to provide a flow control in accordance with the magnitude of the loading in a manner described in connection with the first embodiment, by varying the configuration of the variable throttle 42 and the operative position of the flow path switching valve 12 in accordance with a loading.

Figure 9:
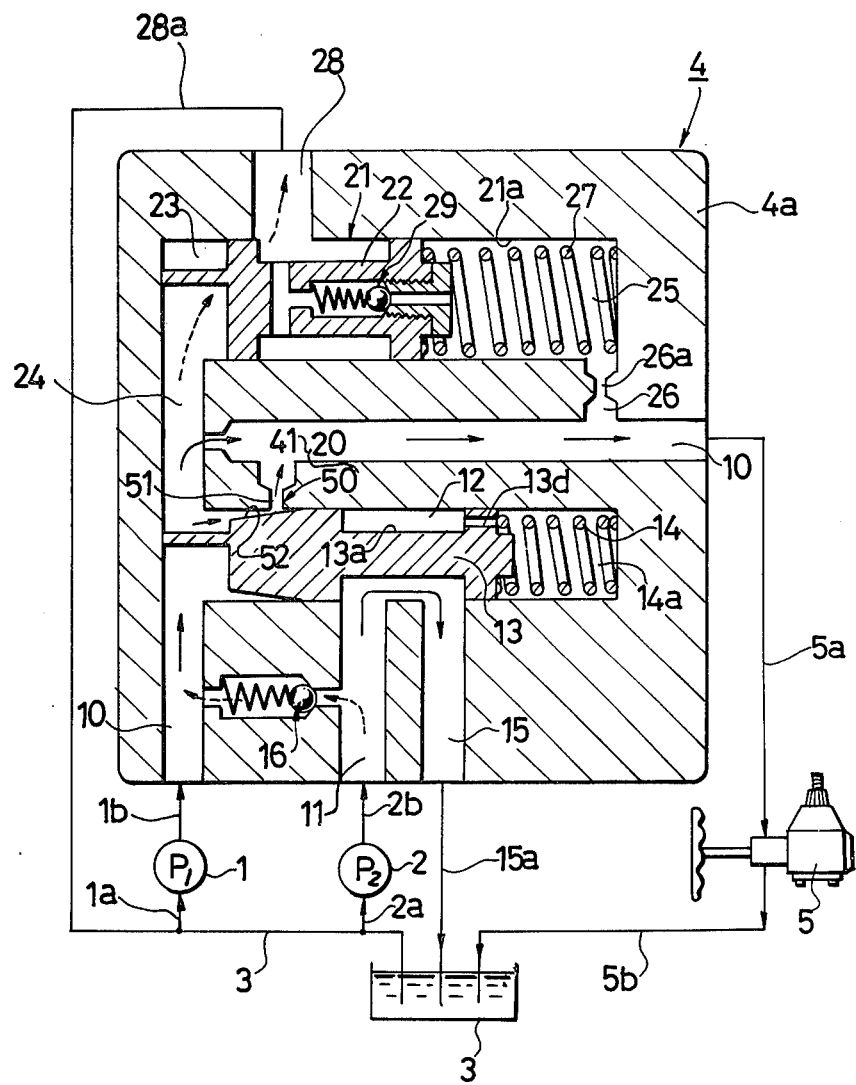

FIG. 9 shows a modification of the embodiment shown in FIG. 8. In this instance, the check valve 16 is separate from the flow path switching valve, and a variable throttle 50 is defined by an opening 51 of the main passage 10 and a tapered region 52 formed around the outer periphery of the spool 13. In this arrangement, a movement of the spool 13 permits the throttle opening of the variable throttle 50 or the entire variable orifice 20 to be continuously varied.

In each of the described embodiments, a pair of pump 1, 2 have been used as a source of hydraulic oil to be supplied. However, it should be understood that the invention is not limited thereto, but that a plurality of pumps may be used, one of which is used as a main pump while the remaining pumps are used as auxiliary pumps so as to be selectively connected with a main passage for merging the hydraulic oil therefrom with the hydraulic oil from the main pump.

While the invention has been illustrated and described above in connection with several embodiments thereof, it should be understood that the invention is not limited thereto but that a number of changes, modifications and variations are possible by one skilled in the art without departing from the spirit and scope of the invention as defined by the appended claims.

What is claimed is:

1. An apparatus for supplying hydraulic fluid comprising a first and a second pump for separately discharging a hydraulic fluid, a main passage for supplying hydraulic oil from the first pump to a hydraulic unit, a flow path switching valve disposed intermediate the main passage and normally connecting the second pump with a tank and responsive to an increased loading on the hydraulic unit by disconnecting the second pump from the tank and connecting the second pump to the main passage, and a flow control valve disposed intermediate the main passage for returning to the tank part of the hydraulic fluid from the first pump or part of the combined hydraulic fluid from the first and the second pumps, the flow control valve being controlled by a pressure differential across a variable orifice disposed intermediate the main passage and said variable orifice having a throttle opening which changes as the flow path switching valve operates.

2. An apparatus according to claim 1 in which the flow path switching valve and the flow control valve are both of a spool type.

3. An apparatus according to claim 2 in which the variable orifice is defined by the outer periphery of the spool which forms the flow path switching valve and an opening of the main passage which is located opposite thereto, the throttle opening varying with a movement of the spool.

4. An apparatus according to claim 2 in which the variable orifice is defined by a fixed throttle formed intermediate the main passage, and a variable throttle disposed to connect the upstream and the downstream side of the fixed throttle and opening toward the flow path switching valve so as to be opened or closed by the outer periphery of the spool thereof.

5. An apparatus according to claim 2 in which the variable orifice is defined by a fixed throttle disposed intermediate the main passage, and a variable throttle formed by an opening directed toward the flow path switching valve and the outer periphery of the spool which forms the flow path switching valve and disposed to connect the upstream and the downstream side of the fixed throttle, the throttle opening of the variable throttle varying with a movement of the spool.

6. An apparatus according to claim 2, 3, 4 or 5 in which the throttle opening of the variable orifice increases with an increasing movement of the spool which forms the flow path switching valve.

7. An apparatus according to claim 2, 3, 4 or 5, further including a relief valve disposed within the spool which forms the flow path switching valve for merging hydraulic fluid from the first and the second pump.

8. An apparatus according to claim 2, 3, 4 or 5, further including a relief valve disposed separately from the flow path switching valve for merging hydraulic fluid from the first and the second pump.

9. A hydraulic system, comprising: a power steering device; a reservoir for hydraulic fluid; first and second pumps each having an inlet and an outlet, said pumps being adapted for individually delivering separate flows of pressurized hydraulic fluid through their respective outlets; means defining a main passage connected between the outlet of said first pump and said power steering device for supplying pressurized hydraulic fluid for operating said power steering device; a flow path switching valve comprising an elongated first chamber having at one longitudinal end thereof a first port which is connected to said main passage, said first chamber having in the side wall thereof a first inlet opening which is connected to the outlet of said second pump and a first outlet opening which is connected to said reservoir, a first spool valve slidably disposed in said first chamber so that one end thereof is acted on by the hydraulic pressure in said first port and first spring means acting on the other end of said first spool valve for continuously urging said first spool valve toward said first port whereby said first spool valve is normally positioned in a first position when the hydraulic pressure in said first port is low and is shiftable to a second position when the hydraulic pressure in said first port is sufficient to overcome the biasing force of said first spring means, said first spool valve having a first passage for connecting said first inlet opening to said first outlet opening when said first spool valve is in said first position and for isolating said first inlet opening from said first outlet opening when said first spool valve is in said second position, said first spool valve having a second passage for connecting said first inlet opening to said first port when said spool valve is in said second position, said second passage having a first one-way valve therein so that hydraulic fluid can flow only from said first inlet opening to said first port and not vice versa, said main passage having a throttle opening into said first chamber at a location close to but downstream from said first port, said one end of said first spool valve having a peripheral portion of reduced diameter and an adjacent tapered peripheral portion which are cooperable with said throttle opening to define a variable orifice which changes in effective size as said flow path switching valve moves between said first and second positions; a flow control valve comprising an elongated second chamber having at one longitudinal end thereof a second port which is connected to said main passage, said second chamber having in the side wall thereof a second inlet opening connected to said main passage downstream from said variable orifice and a second outlet opening connected to said reservoir, said second inlet opening communicating with the opposite longitudinal end of said second chamber, a second spool valve slidably disposed in said second chamber so that one end thereof is acted on by the hydraulic pressure in said second port, second spring means acting on the other end of said second spool valve in combination with the hydraulic pressure supplied through said second inlet opening for continuously urging said second spool valve toward said second port whereby said second spool valve is normally positioned in a first position when the hydraulic pressure in said second port is low and is shiftable to a second position when the hydraulic pressure in said second port is sufficient to overcome the biasing force of said second spring means and the hydraulic pressure in said second inlet opening, said second spool valve having a first valve element for blocking communication between said second port and said second outlet opening when said second spool valve is in its first position and for establishing communication therebetween when said second spool valve is in its second position, said second spool valve having a third passage connecting said second inlet opening to said second outlet opening, said third passage having a second one-way valve therein so that hydraulic fluid can flow from said second inlet opening to said second outlet opening and not vice versa.

* * * * *